United States Patent
Di Balsamo et al.

(10) Patent No.: US 9,612,878 B2
(45) Date of Patent: Apr. 4, 2017

(54) RESOURCE ALLOCATION IN JOB SCHEDULING ENVIRONMENT

(71) Applicant: International Business Machines Corporation, Armonk, NY (US)

(72) Inventors: Arcangelo Di Balsamo, Aprilia (IT); Valentina Migliaccio, Rome (IT); Francesca L. Pasceri, Guidonia (IT)

(73) Assignee: International Business Machines Corporation, Armonk, NY (US)

( * ) Notice: Subject to any disclaimer, the term of this patent is extended or adjusted under 35 U.S.C. 154(b) by 64 days.

(21) Appl. No.: 14/230,669

(22) Filed: Mar. 31, 2014

(65) Prior Publication Data

US 2015/0277987 A1    Oct. 1, 2015

(51) Int. Cl.
*G06F 9/50* (2006.01)
*G06Q 10/00* (2012.01)

(52) U.S. Cl.
CPC .......... *G06F 9/5083* (2013.01); *G06Q 10/00* (2013.01)

(58) Field of Classification Search
None
See application file for complete search history.

(56) References Cited

U.S. PATENT DOCUMENTS

| | | | |
|---|---|---|---|
| 6,574,587 B2 * | 6/2003 | Waclawski | 702/186 |
| 7,898,679 B2 * | 3/2011 | Brack et al. | 358/1.15 |
| 8,266,622 B2 | 9/2012 | Cardelli | |
| 8,386,607 B2 * | 2/2013 | Hu | G06F 9/5083 709/223 |
| 8,788,310 B2 * | 7/2014 | Dube | G06Q 30/0283 705/7.23 |
| 8,856,793 B2 * | 10/2014 | Picinich et al. | 718/102 |
| 8,880,671 B2 * | 11/2014 | Bhogal | G06F 9/5072 709/200 |
| 9,027,024 B2 * | 5/2015 | Mick | H04L 43/0817 709/224 |

(Continued)

FOREIGN PATENT DOCUMENTS

WO    2013000893 A1    1/2013

OTHER PUBLICATIONS

Garg, Saurabh Kumar, Srinivasa K. Gopalaiyengar, and Rajkumar Buyya. "SLA-based resource provisioning for heterogeneous workloads in a virtualized cloud datacenter." international conference on Algorithms and architectures for parallel processing. Springer Berlin Heidelberg, 2011.*

(Continued)

*Primary Examiner* — Matthew Brophy
(74) *Attorney, Agent, or Firm* — Jay Wahlquist

(57) ABSTRACT

According to embodiments of the disclosure, methods, systems, and computer program products are disclosed. A computer implemented method of allocating resources in a job scheduling system may include segmenting a workload plan into one or more time slots, determining, prior to each time slot, a job forecast for the time slot, the job forecast based on historical job data, and modifying the resource pool to bring a resource pool parameter within a resource range in response to determining that the job forecast exceeds a job deadline. The workload plan may have one or more jobs for a resource pool, the one or more jobs may be scheduled in at least one of the time slots. The resource pool may have one or more resources.

20 Claims, 7 Drawing Sheets

(56) References Cited

U.S. PATENT DOCUMENTS

| | | | |
|---|---|---|---|
| 9,137,130 B2* | 9/2015 | Driesen | H04L 43/0876 |
| 9,253,048 B2* | 2/2016 | Bhogal | G06F 9/5072 |
| 9,307,048 B2* | 4/2016 | Kandula | H04L 67/325 |
| 2005/0114274 A1* | 5/2005 | Dube et al. | 705/400 |
| 2005/0246567 A1* | 11/2005 | Bretschneider | G06F 11/1474 |
| | | | 714/2 |
| 2006/0167984 A1* | 7/2006 | Fellenstein et al. | 709/203 |
| 2007/0038498 A1* | 2/2007 | Powell et al. | 705/8 |
| 2007/0174069 A1* | 7/2007 | Moore et al. | 705/1 |
| 2007/0180451 A1* | 8/2007 | Ryan et al. | 718/104 |
| 2007/0283351 A1* | 12/2007 | Degenaro et al. | 718/100 |
| 2007/0294408 A1* | 12/2007 | Jackson | 709/226 |
| 2008/0115143 A1* | 5/2008 | Shimizu et al. | 718/105 |
| 2008/0256238 A1* | 10/2008 | Hu | G06F 9/5083 |
| | | | 709/226 |
| 2009/0006173 A1* | 1/2009 | Farrell et al. | 705/9 |
| 2009/0158294 A1 | 6/2009 | Perticara' | |
| 2010/0076856 A1* | 3/2010 | Mullins | 705/26 |
| 2010/0281166 A1* | 11/2010 | Buyya et al. | 709/226 |
| 2010/0306776 A1* | 12/2010 | Greene | G06Q 10/10 |
| | | | 718/101 |
| 2012/0042256 A1* | 2/2012 | Jamjoom et al. | 715/736 |
| 2012/0131591 A1* | 5/2012 | Moorthi et al. | 718/104 |
| 2012/0260260 A1 | 10/2012 | Cardelli et al. | |
| 2013/0124704 A1* | 5/2013 | Bhogal | G06F 9/5072 |
| | | | 709/223 |
| 2013/0179371 A1* | 7/2013 | Jain et al. | 705/400 |
| 2013/0179881 A1 | 7/2013 | Calder et al. | |
| 2013/0185433 A1* | 7/2013 | Zhu | H04L 67/303 |
| | | | 709/226 |
| 2013/0290953 A1 | 10/2013 | Li et al. | |
| 2014/0040913 A1* | 2/2014 | Wuttke et al. | 718/104 |
| 2014/0310714 A1* | 10/2014 | Chan | G06F 17/30598 |
| | | | 718/102 |
| 2015/0012638 A1* | 1/2015 | Bhogal | G06F 9/5072 |
| | | | 709/223 |
| 2015/0212808 A1* | 7/2015 | Mandava | G06F 8/65 |
| | | | 717/168 |
| 2015/0271249 A1* | 9/2015 | Segre | G06F 11/00 |
| | | | 709/217 |
| 2015/0271331 A1* | 9/2015 | Segre | H04M 3/5232 |
| | | | 379/265.09 |
| 2015/0277987 A1* | 10/2015 | Di Balsamo | G06F 9/5083 |
| | | | 718/104 |

OTHER PUBLICATIONS

Garg, Saurabh Kumar, et al. "SLA-based virtual machine management for heterogeneous workloads in a cloud datacenter." Journal of Network and Computer Applications 45 (2014): 108-120.*

Cheng, Dazhao, Changjun Jiang, and Xiaobo Zhou. "Heterogeneity-aware workload placement and migration in distributed sustainable datacenters." Parallel and Distributed Processing Symposium, 2014 IEEE 28th International. IEEE, 2014.*

Anonymous, "Efficient Task Execution and Progress Reporting for Complex Jobs", IP.com Prior Art Database Technical Disclosure, IP.com No. IPCOM000221077D, Published Aug. 28, 2012. http://ip.com/IPCOM/000221077.

IBM, "A method to monitor delays of jobs with a service level agreement deadline", IP.com Prior Art Database Technical Disclosure, IP.com No. IPCOM000186528D, Published Aug. 25, 2009. http://ip.com/IPCOM/000186528.

Mell et al., "The NIST Definition of Cloud Computing", National Institute of Standards and Technology, Sep. 2011, NIST Special Publication 800-145, U.S. Department of Commerce, Gaithersburg, MD.

* cited by examiner

RESOURCE ALLOCATION IN JOB SCHEDULING ENVIRONMENT

BACKGROUND

The present disclosure relates to resource management in job scheduling systems, more particular aspects relate to management of computing resources in a resource pool. In job scheduling environments, various jobs may require computational resources in order to be executed and to avoid violations of Service Level Agreements (SLAs) with users. In various instances, pools of computing resources in the job scheduling environment may be modified to increase efficiency of a job scheduling system and may reduce violations of SLAs.

SUMMARY

Embodiments of the disclosure provide a method, system, and computer program product for processing data.

According to embodiments of the present disclosure, a computer implemented method of allocating resources in a job scheduling system may include segmenting a workload plan into one or more time slots, determining, prior to each time slot, a job forecast for the time slot, the job forecast based on historical job data, and modifying the resource pool to bring a resource pool parameter within a resource range in response to determining that the job forecast exceeds a job deadline. The workload plan may have one or more jobs for a resource pool, the one or more jobs may be scheduled in at least one of the time slots. The resource pool may have one or more resources.

Modifying the resource pool to bring the resource pool parameter within the resource range in response to determining that the job forecast exceeds the job deadline may also include allocating one or more additional resources to the resource pool in response to determining that the resource pool parameter is greater than an upper resource limit. Modifying the resource pool to bring the resource pool parameter within the resource range in response to determining that the job forecast exceeds the job deadline may also include deallocating one or more resources from the resource pool in response to determining that the resource pool parameter is less than a lower resource limit.

The method may further include determining whether the one or more jobs includes a critical job where the resource pool is modified to bring the resource pool parameter within a resource range in response to determining that the one or more jobs includes the critical job and determining that the job forecast exceeds the job deadline range. The job forecast may be based on historical job data and a job submission rate of jobs. The one or more resources may be accessed by the job scheduling system via a network. The one or more resources may be one or more selected from the group consisting of network bandwidth, servers, processing, memory, storage, applications, and virtual machines. The resource range may be based on an average central processing unit utilization parameter of the resource pool. The resource range may be based on a quantity of resources in the resource pool. The resource range may be based on a ratio of the one or more jobs to the one or more resources.

A system for allocating resources in a job scheduling system, may include a data aggregator, the data aggregator configured to segment a workload plan into one or more equal time slots. The system may include a resource evaluator, the resource evaluator configured to determine, prior to each time slot, a job forecast for the time slot, the job forecast based on the historical job data. The system may also include a resource manager, the resource manager configured to modify the resource pool to bring a resource pool parameter within a resource range in response to determining that the job forecast exceeds a job deadline. The workload plan may have one or more jobs for a resource pool, the resource pool having one or more resources;

Being configured to modify the resource pool to bring the resource pool parameter within the resource range in response to determining that the job forecast exceeds the job deadline may include being configured to allocate one or more additional resources to the resource pool in response to determining that the resource pool parameter is greater than an upper resource limit. Being configured to modify the resource pool to bring the resource pool within a resource range in response to determining that the job forecast exceeds the job deadline may include being configured to deallocate one or more resources from the resource pool in response to determining that the resource pool parameter is less than a lower resource limit.

The resource evaluator may be further configured to determine whether the one or more jobs includes a critical job and wherein the resource manager is further configured to modify the resource pool to bring the resource pool parameter within the resource range in response to determining that the one or more jobs includes the critical job and determining that the job forecast exceeds the job deadline. The job forecast may be based on historical job data and on a job submission rate of transactional jobs. The resource range may be based on an average central processing unit utilization parameter of the resource pool. The resource range may be based on a quantity of resources in the resource pool. The resource range may be based on a ratio of the one or more jobs to the one or more resources. The one or more resources may be one or more selected from the group consisting of network bandwidth, servers, processing, memory, storage, applications, and virtual machines.

A computer program product for allocating resources in a job scheduling system, the computer program product may include segmenting a workload plan into one or more time slots, the workload plan having one or more jobs for a resource pool, the one or more jobs scheduled in at least one of the time slots, the resource pool having one or more resources. The computer program product may include determining, prior to each time slot, a job forecast for the time slot, the job forecast based on historical job data. The computer program product may also include modifying the resource pool to bring a resource pool parameter within a resource range in response to determining that the job forecast exceeds a job deadline.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
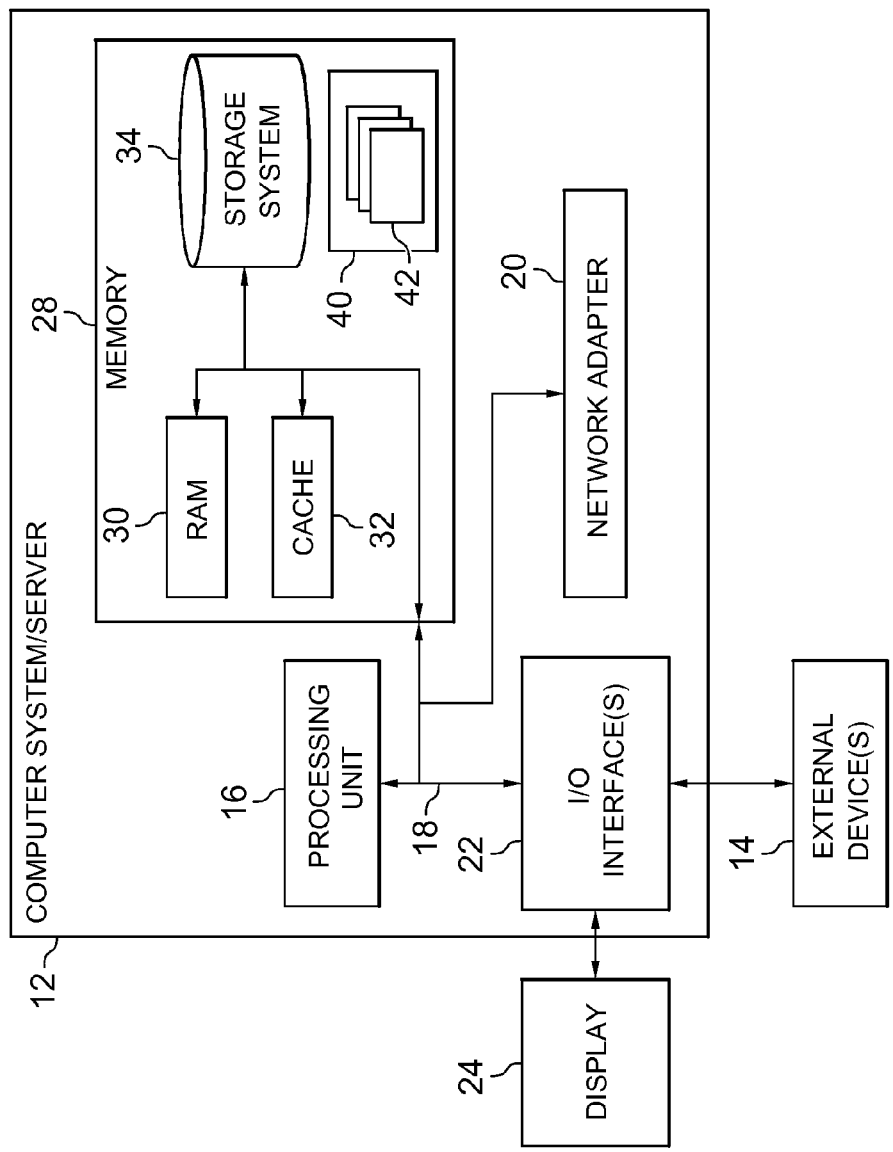
FIG. 1 depicts a cloud computing node according to an embodiment of the present disclosure.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Aspects of the present disclosure relate to resource management in job scheduling systems, more particular aspects relate to management of computing resources in a resource pool. While the present disclosure is not necessarily limited to such applications, various aspects of the disclosure may be appreciated through a discussion of various examples using this context.

It is understood in advance that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services. Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Cloud computing and cloud computing service models may provide for flexible use of computing resources, herein referred to as resources. Resources may include processing power, storage, networks, and other computing resources which may be supplied over the cloud or supplied locally using a hypervisor or other device which may allow control of a virtualized infrastructure. Resources may include virtualized machines or physical hardware. A resource provider may provide a resource pool having one or more resources. The resource pool may be utilized to execute jobs using the resources in the resource pool. The resource pool may be dynamically expanded or reduced by allocating or deallocating resources from the resource pool. In an embodiment, the resource provider may be a cloud based IaaS provider. Typically, IaaS providers allow to instantiate, on-demand, an arbitrary number of resources, such as virtual machines (VM) running the same system image, or hardware capabilities. The resource pool may be expanded or reduced for various reasons. In an embodiment, the resource pool may be expanded or reduced based upon the computing requirements of the user. In another embodiment, the resource pool may be expanded or reduced based on a Service Level Agreement (SLA) for the resource pool. In another embodiment, a policy evaluator may be used to dynamically adjust resource pools in order to meet changing resource requirements of a system.

The policy evaluator may manage the resource pool. The resource pool may be used to execute jobs. Jobs may be various computing tasks which utilize one or more computing resources in the resource pool. The resource pool may execute jobs using computing resources in a planned schedule, herein referred to as a workload plan. A job scheduling system, such as a Tivoli Workload Scheduler network may be used to create and execute one or more workload plans for the resource pool. One or more resource pools may be assigned a workload plan, the workload plan may include one or more jobs.

To improve service performance of the resource pool in executing the workload plan, the policy evaluator, may be used to dynamically modify resources in the resource pool. The policy evaluator may modify the resource pool to maintain enough resources to perform jobs in the workload plan while also keeping the resource pool small enough so that resources do not unnecessarily sit underutilized in the resource pool. The policy evaluator may allocate/deallocate resources regardless of a resource provider (e.g., private or public cloud, or VM hypervisor, or other component able to offer control on a virtualized infrastructure). The policy evaluator may provide SLA support for the resource pool. The SLA may be an agreed upon level of computational service which the resource pool may be expected to maintain. In order to define a desired level of service quality, the policy evaluator may associate an SLA with each resource pool. Such SLA may be represented in the job scheduling system via a policy. The policy may be a logical expression. Each resource pool may have its own SLA policy, which may control the allocation/deallocation of resources in the resource pool in both cloud environments, virtualized environments, and physical hardware. The policy evaluator may increase resource pool compliance with the SLA. In an embodiment, the SLA may be represented by a resource range which may indicate an upper and a lower limit of resources that the job scheduling system may maintain in the resource pool.

To achieve flexibility in allocating resources, and to comply with the requirements of the SLAs, the components of a resource providing system may be organized according to a resource policy evaluator. Using the policy evaluator may improve responses to changing components, changing workload, and changing environmental conditions, while minimizing the operating costs and reducing violations of the SLAs. Therefore, it may be advantageous to provide a policy evaluator designed to modify resource pools.

A method of allocating resources in a job scheduling system may include segmenting a workload plan into one or more time slots, the workload plan having one or more jobs for a resource pool. The one or more jobs may be scheduled in at least one of the time slots, the resource pool having one or more resources. The method may also include determining, prior to each time slot, a job forecast for the time slot, the job forecast based on historical job data. The method may also include modifying the resource pool to bring a resource pool parameter within a resource range in response to determining that the job forecast exceeds a job deadline.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. In an embodiment, the memory 28 may store a hypervisor. In another embodiment, a policy evaluator, described further below, may be stored in memory 28. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
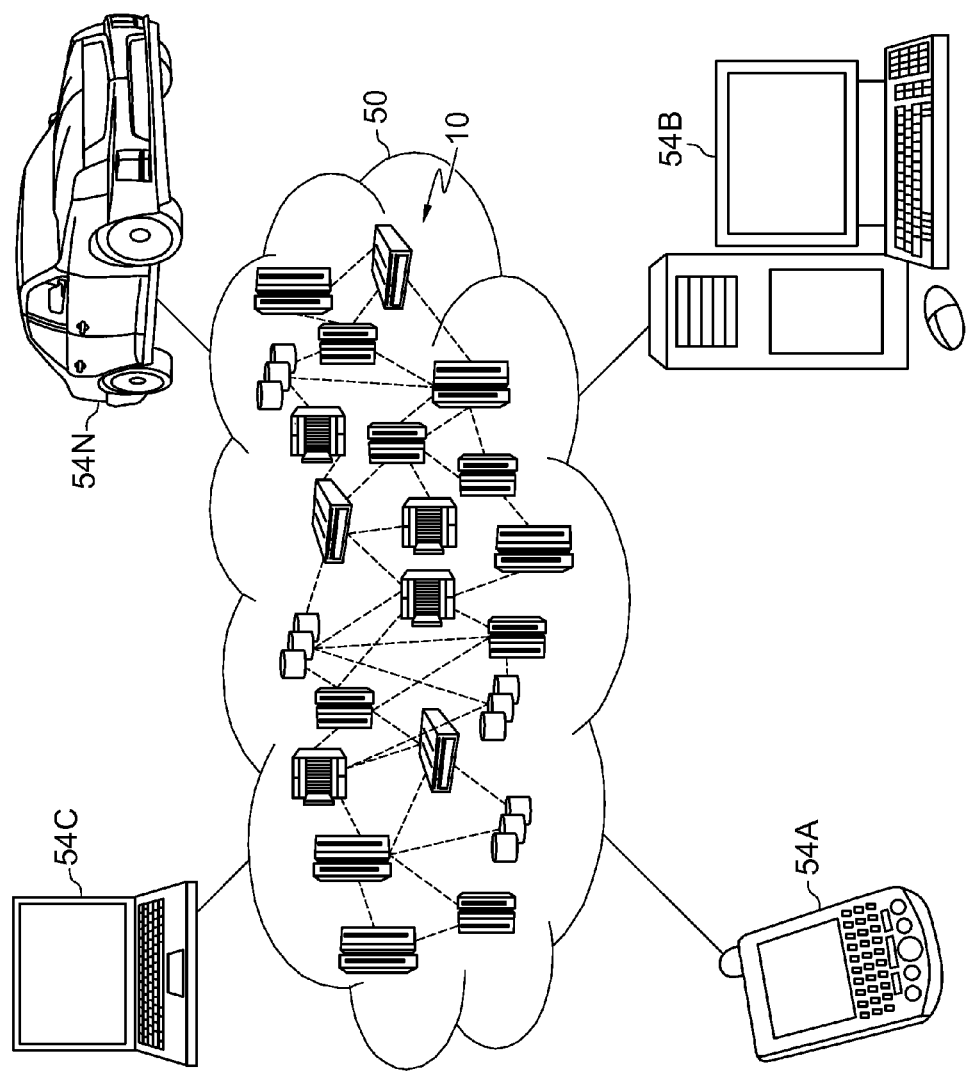
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
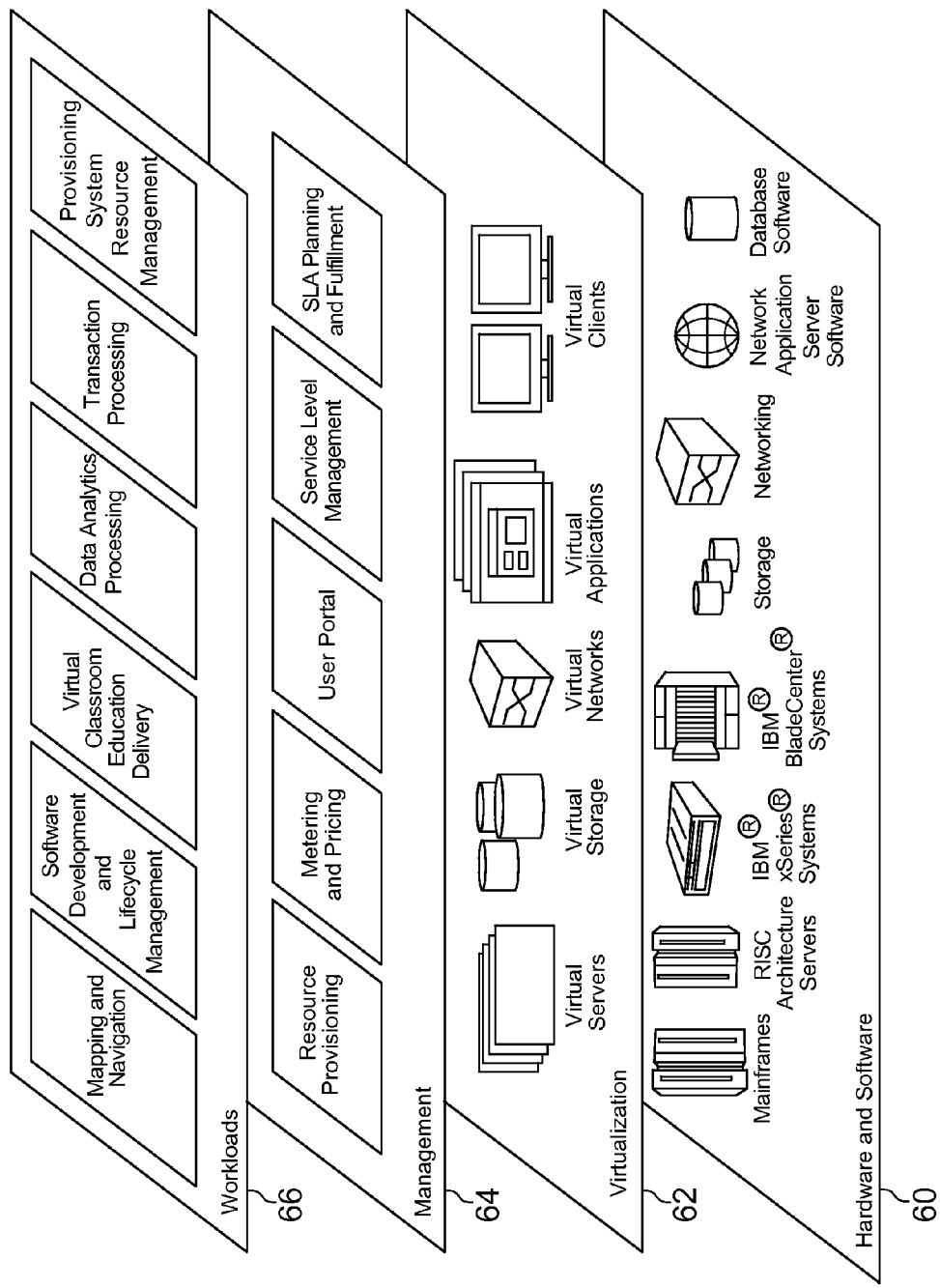
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities, or virtual resources, may be provided: virtual machines; virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In another example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and policy evaluator 400 (FIG. 4) for resource management in of a resource pool.

Figure 4:
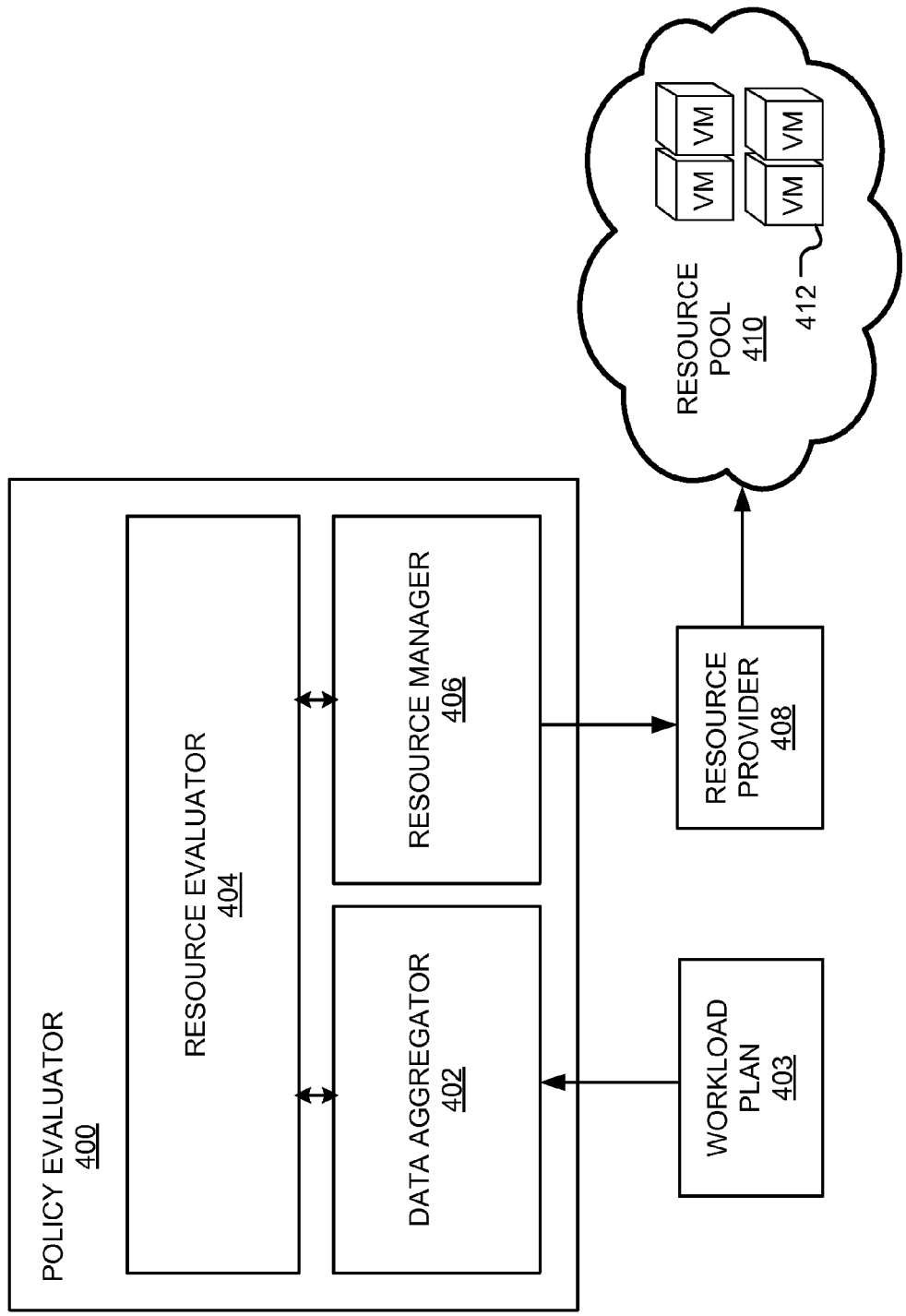
FIG. 4 depicts a policy evaluator according to an embodiment of the present disclosure.

Referring now to FIG. 4, a policy evaluator 400 for resource allocation in a job scheduling system may be seen according to an embodiment. The policy evaluator 400 may include a data aggregator 402, a resource evaluator, 404, and a resource manager 406. The data aggregator 402 may receive a workload plan 403. The resource manager 406 may communicate with a resource provider 408, which may modify a resource pool 410 having one or more resources such as virtual machines 412.

The data aggregator 402 may create an allocation schedule for the policy evaluator 400. The allocation schedule may provide a forecast involving incoming jobs and plan one or more resource allocation events for the policy evaluator 400. The data aggregator 402 may be configured to access a workload plan 403 and incorporate the information from the workload plan into the allocation schedule. The workload plan 403 may be accessed from multiple sources, including a database, network, local storage, or other suitable source. The workload plan 403 may include job information including job start time, job completion dates, job deadlines, job types, priority information, and other job information. The workload plan 403 may be a schedule of jobs over time. The data aggregator 402 may use the information in the workload plan 403 to assemble the allocation schedule. The data aggregator 402 may create the allocation schedule by segmenting the workload plan 403 into time slots. The time slots may be various sizes and represent portions of the workload plan 403. In an embodiment, the time slots may equally divide the allocation schedule into time slots of equal size.

Prior to each time slot, an iteration of the policy evaluator 400 resource allocation may be launched. Resource allocation may have the purpose of determining whether one or more jobs will have a job completion date which occurs prior to the job deadline and modifying the resource pool 410 to ensure the SLA will be satisfied during the next slot. In an embodiment, the SLA may be represented as a resource range. The resource range may be a defined range of computing parameters which the resource pool 410 may be expected to maintain. In an embodiment, the resource range may have an upper limit and a lower limit for resources in the resource pool 410. The resource range may be implemented using hysteresis to select the upper resource limit and lower resource limit. By using hysteresis the upper and lower resource limits may be selected such that the frequency of modifications from resource allocation is decreased.

Jobs may include at least two types of workloads including batch jobs and transactional jobs. Batch jobs may be scheduled and stored in the workload plan 403 at time of creation of the workload plan 403. Batch jobs may be jobs which process large amounts of data in pre-scheduled time slots. For example, the batch jobs may be scheduled to execute a sequence of routine business processes. Transactional jobs, however, may process data in real time and may not be known of prior to creation of the workload plan 403. Jobs may also have priority information. Priority information may be labels which identify critical jobs and non-critical jobs. In an embodiment, the policy evaluator 400 may be configured to operate only in the case of critical jobs. This may allow the policy evaluator 400 to dynamically expand or reduce a resource pool 410 when the allocation schedule includes one or more important jobs. In an embodiment, the policy evaluator may perform resource allocation in response to determining that the allocation schedule contains one or more critical jobs.

The resource evaluator 404 may determine historical job data to the one or more jobs in the allocation schedule and may determine a job forecast for the allocation schedule. The job forecast may be a prediction of a job completion date for the one or more jobs. The job forecast may also include a resource forecast. The job completion date may be affected by multiple factors such as resources in the resource pool, the number of jobs in a particular time slot, the resource requirements of those jobs, and the likelihood of transactional jobs. The resource forecast may be a prediction of resources needed by the resource pool to perform jobs in the next time slot. The number of resources compared to the resource requirements of jobs in the particular time slot will affect the job forecast. For example, the more resources per job the faster jobs may be executed, and the earlier the job completion date may be. In another example, the fewer the resource per job the slower jobs may be executed, and the later the job completion date may be. The job forecast may be based on job information including historical job data and submission rate of jobs.

The resource evaluator 404 may also analyze the output of one or more previous time slots and may compute an estimation of the amount of computing resources needed to manage incoming jobs in the next time slot. The resource evaluator 404 may also determine whether the level of computing resources currently in the resource pool 410 will be sufficient in view of the job forecast to satisfy the SLA in the next time slot.

The resource evaluator 404 may determine the job forecast based on job information including historical job data. In an embodiment, the resource evaluator 404 may identify all predecessors of the jobs expected to run during the next time slot. For batch jobs the resource evaluator 404 may retrieve prior known historical job data regarding the batch job. Because batch jobs may be known prior to being scheduled in the workload plan 403, and because batch jobs may be scheduled in accord with a periodic pattern (e.g., daily, weekly, etc.), historical job information may be more efficiently used to estimate job completion dates and resource requirements of the batch jobs. While the number and identity of transactional jobs may not be known of prior to creation of a workload plan 403, historical data may be used to determine a probability that a certain number or type of transactional job will be received in a particular time slot. The historical job data may include computing information such as CPU utilization, job completion time, and other historical job information.

For example, the resource evaluator 404 may analyze the workload plan 403, in order to identify a list of jobs expected to be running during a particular time slot. Such analysis, may typically occur in advance of the particular time slot. The resource evaluator 404 may identify jobs scheduled to start in the particular time slot, and may identify jobs which are currently active in the particular time slot. With the job list obtained, the resource evaluator 404 may access jobs-related historical information (e.g., CPU time, completion time), that may allow computation of an estimation of resource needs and the job completion dates for the jobs in the slot of interest.

As transactional jobs may not be known prior to creation of the workload plan 403, the job forecast of resource needs may be based on a job submission rate of transactional jobs. For example, the resource evaluator 404 may determine the average arrival rate observed in one or more previous time slots to the particular time slot. The resource evaluator 404 may then forecast a job completion dates by predicting resource usage based on the arrival rate of transactional jobs observed in the previous time slot. However, other methods of determining the job forecast for transactional jobs may be used including methods utilizing reactive heuristics, proactive heuristics, or other suitable methods.

SLAs for the resource pool 410 may vary depending upon the needs of the user. In an embodiment, the SLA may be a policy represented as a resource range having an upper and lower resource limit of computing parameters for the resource pool 410. In an embodiment, the resource range may be based on an average central processing unit utilization parameter of the resource pool 410. In another embodiment, the resource range may be based on a quantity of resources in the resource pool 410. In another embodiment, the resource range is based on a ratio of the one or more jobs to resources. In an embodiment the resource range may have an upper resource limit set at eighty percent (80%) CPU utilization so that when the resource pool parameter is represented by a CPU utilization level, a greater than 80% CPU utilization violates the SLA policy. However the lower resource limit may be set at fifty percent (50%) CPU utilization so that when the resource pool parameter is represented by a CPU utilization level, a less than 50% CPU utilization will violate the SLA policy. By making the upper resource limit and the lower resource limit different, the frequency of modifications to the resource pool based on the SLA policy may be reduced. In another embodiment, the resource range may have a lower resource limit set at five (5) resources, so that if the resource pool parameter is represented by the number of resources in the resource pool, a parameter of less than five resources violates the SLA policy. In another embodiment, the resource range may have an upper resource limit set at ten (10) so that if the resource pool parameter has greater than 10 resources then the SLA policy is violated. Other computing parameters may be used including, but not limited to, the quantity of free memory, the number of CPU cycles for a virtual machine, I/O rates.

The resource manager 406 may manage the resource pool 410 and issue commands to modify the resource pool 410. The resource manager 406 may monitor the resource pool and determine a resource pool parameter. The resource pool parameter may be a representation of computing resources in the resource pool. For example, the resource pool parameter may include a CPU utilization level, the number of resources in the resource pool, or the ratio the number of jobs in the workload plan to the number of resources in the resource pool. The resource pool parameter may be used to determine whether the resource pool is satisfying the SLA policy, by determining whether the resource pool parameter is within the computing requirements of the SLA policy.

In an embodiment, the resource manager 406 may allocate additional resources, such as virtual machines 412, hardware, or other resources to the resource pool 410 in response to determining that the resource pool parameter is greater than the upper resource limit. In another embodiment, the resource manager 406 may deallocate resources from the resource pool 410 in response to determining that the resource pool parameter is less than a lower resource limit. The resource provider 408 may provide the resources to the resource pool 410 after receiving requests from the resource manager 406. In an embodiment, the resource provider 408 may be an IaaS provider. In another embodiment resource provider 408 could be a private or public cloud, a hypervisor, or a component able to offer control on a virtualized infrastructure. The resource manager 406 may modify the resource pool 410 to bring the resource pool parameter within the upper and lower resource limits of the resource range. As described above, the upper and lower limits may be selected using principles of hysteresis in order to reduce the frequency of the resource manager of quickly allocating and reallocating resources to the resource pool if the resource pool parameter is spiking up and down.

The resource manager 406 may allocate one or more additional resources to the resource pool 410 in response to determining that the job forecast is greater than an upper resource limit. The resource manager 406 may also deallocate one or more resources from the resource pool 410 in response to determining that the job forecast is less than a lower resource limit. Thus, the resource pool 410 may have resources scaled to fall within the resource range.

Figure 5A:
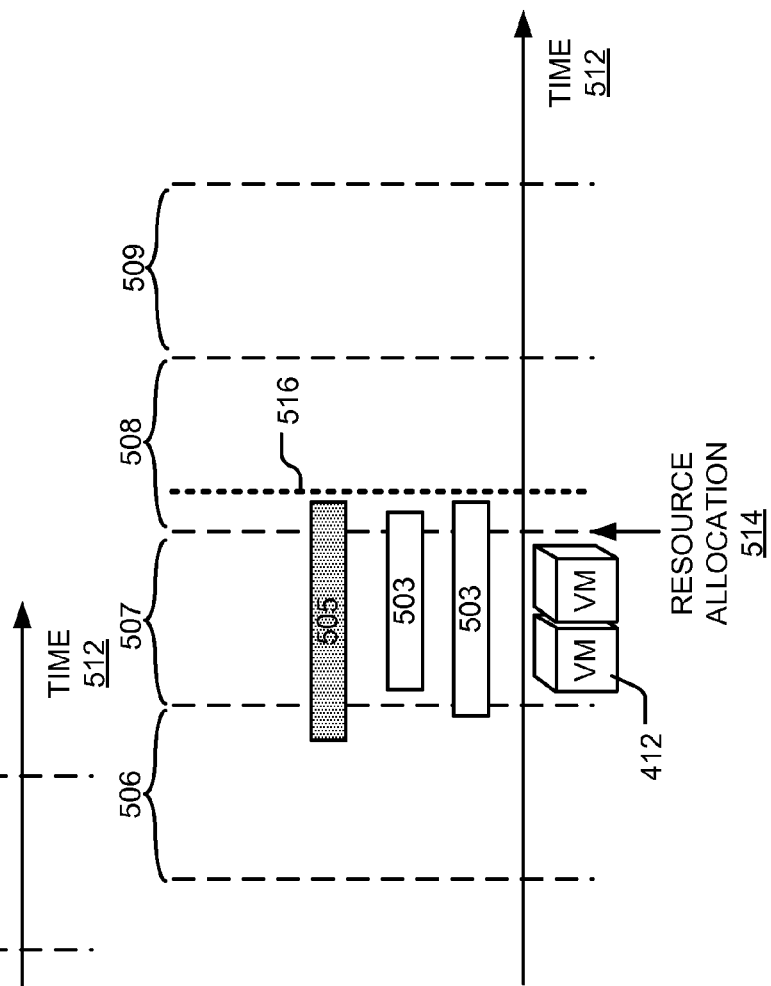
FIG. 5A depicts a workload timeline according to an embodiment of the present disclosure.

Referring now to FIGS. 5A a diagram of an allocation schedule may be seen according to an embodiment. The diagram may include a timeline 512 segmented into time slots 506, 507, 508, 509. The timeline 512 may have one or more jobs 502, including a critical job 504. The timeline 512 may also have a job deadline 516 which may represent a deadline for completion for the one or more jobs and the critical job 504. Resource allocation 514 may occur prior to each time slot 506, 507, 508, and 509. The time slots 506, 507, 508, 509, may be divided into segments of equal length. However in other embodiments, the timeline 512 may have time slots 506, 507, 508, 509 of various sizes. Resource allocation 514 for a resource pool may repeat prior to each time slot 506, 507, 508, 509. This may increase the chances that changes from allocated or deallocated resources from the resource pool may be finished in time for the incoming time slot 506, 507, 508, 509.

In FIG. 5A a diagram may be seen where the resource allocation 514 is occurring prior to time slot 507. Resource allocation may include determining a job forecast for the one or more jobs 502, 504 in the time slot 506. The job forecast may be based on the historical job data for the one or more jobs 502, 504. The historical job data may be the same or substantially similar as discussed above. Resource allocation 514 may also include determining whether the job forecast exceeds the job deadline 516. In FIG. 5A it may be seen that the jobs 502, 504 are represented by blocks. The beginning of the block on the left may represent the job start date and the end of the block on the right may represent the job completion date. The job forecast may determine the job completion date based on historical job data and a resource forecast. In FIG. 5A blocks 504 and 502 may have a job forecast which exceeds the job deadline 516. The resource allocation 514 may include modifying the resource pool, discussed above, to bring the resource pool parameter within a resource range. Modifying the resource pool may include allocating resources to the resource pool. By allocating more resources to the resource pool the job forecast may change so that the job completion date occurs prior to the job deadline 516. This may be due to increased computing power in the resource pool due to the additional resources which may shorten the time it takes the resource pool to execute the jobs 502, 504. The resource allocation 514 may also include determining whether the one or more jobs includes a critical job 504. In an embodiment, the resource allocation may occur only if a critical job 504 is identified.

Figure 5B:
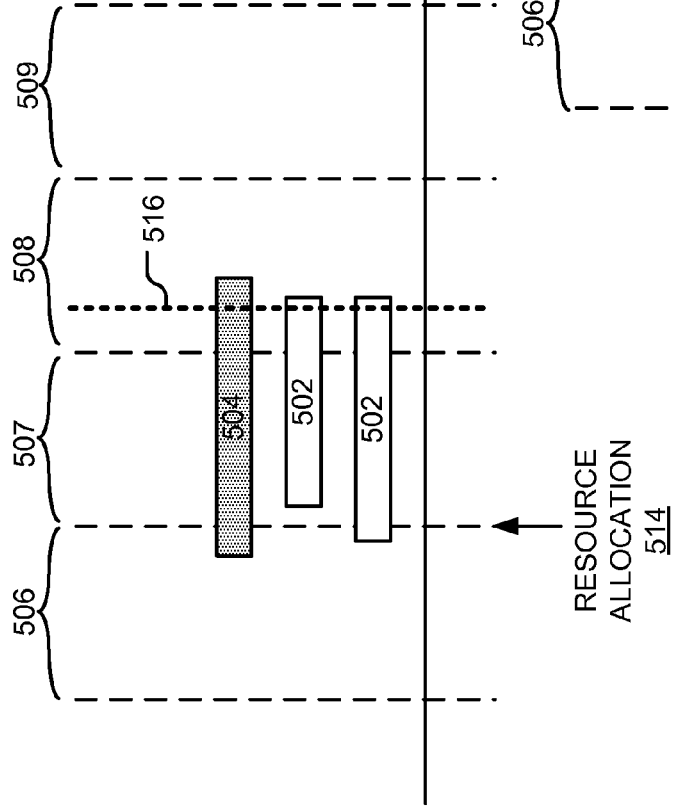
FIG. 5B depicts a workload timeline after an iteration of a resource allocation cycle according to an embodiment of the present disclosure.

In FIG. 5B a diagram may be seen where resources 412 have been allocated to the resource pool. Because the resource pool may have additional resources 412, the jobs 505 and 503 may have earlier job completion dates. In FIG. 5B it may be seen that after resource allocation 514 the jobs 503, 505 have job completion dates prior to the job deadline 516. The resource allocation may then progress to time slot 508 and the process of resource allocation may be repeated throughout each time slot 506, 507, 508, 509.

Figure 6:
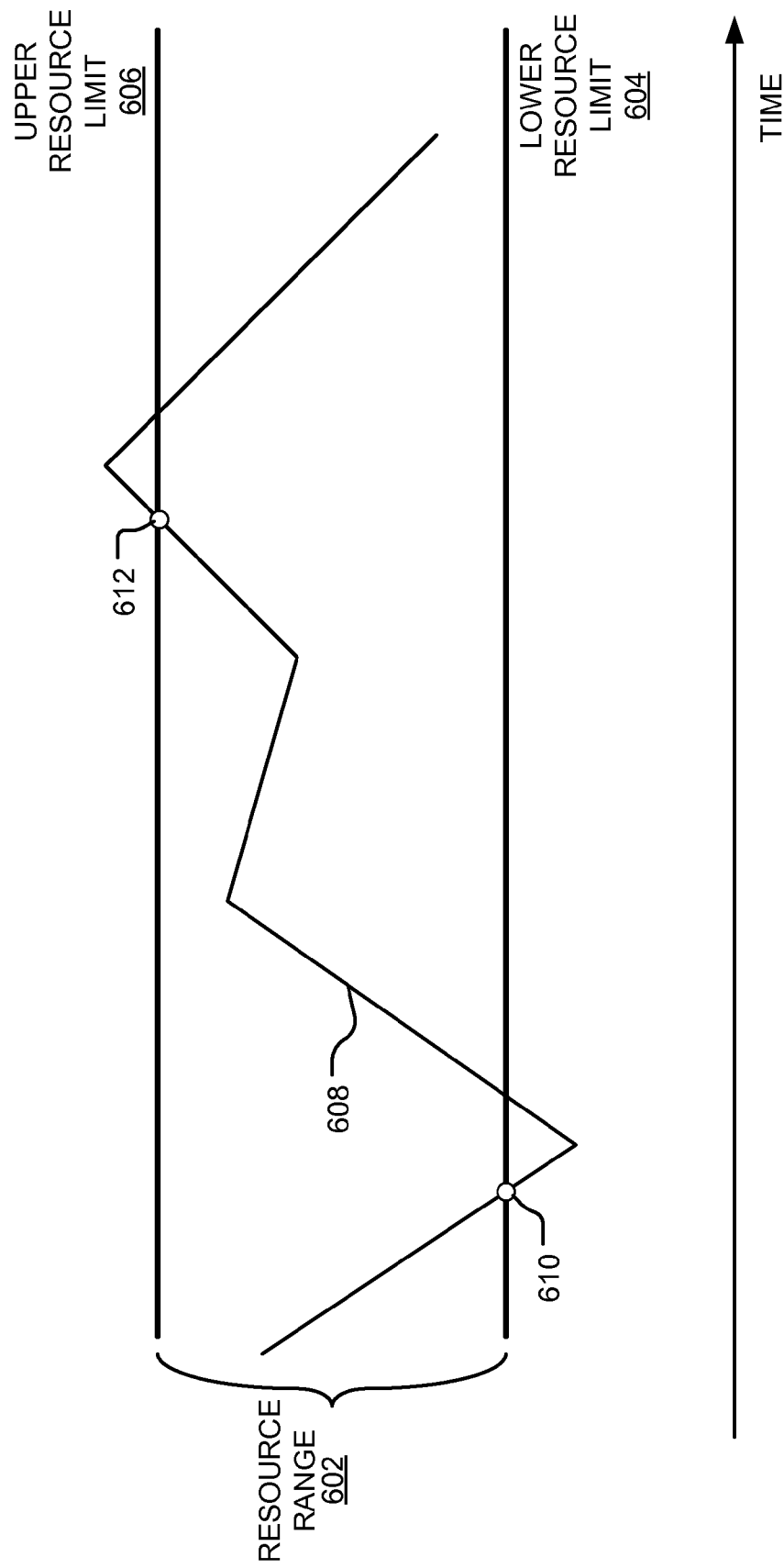
FIG. 6 depicts a graph of resource pool parameter and location in a resource range according to an embodiment of the present disclosure.

Referring now to FIG. 6, a graph of a resource pool parameter 606 and a resource range 602 may be seen according to an embodiment. The resource range 602 may be a defined range of computing parameters which the resource pool may be expected to maintain. The computing parameters of the resource pool may be represented by a resource pool parameter 608. The resource pool parameter may be a representation of computing resources in the resource pool. For example, the resource pool parameter may include a CPU utilization level, the number of resources in the resource pool, or the ratio the number of jobs in the workload plan to the number of resources in the resource pool. The resource pool parameter may be used to determine whether the resource pool is satisfying the SLA policy, by determining whether the resource pool parameter is within the computing requirements of the SLA policy.

The resource range 602 may be a range of values which represent acceptable resource pool parameter values. The resource range 602 may have an upper resource lime 606 and a lower resource limit 604. The resource range 602 may be implemented using hysteresis to select the upper resource limit 606 and lower resource limit 604. By using hysteresis the upper and lower resource limits 604, 606, may be selected such that the frequency of modifications from resource allocation, described above, is decreased.

The resource range 602 may be a representation of an SLA policy for a resource pool as discussed above. In an embodiment, the resource range 602 may be based on an average central processing unit utilization parameter of the resource pool. In another embodiment, the resource range 602 may be based on a quantity of resources in the resource pool. In another embodiment, the resource range 602 is based on a ratio of the one or more jobs to the one or more resources in the resource pool. The resource range 602 may employ hysteresis to reduce the frequency of events where the resource pool is modified. In an embodiment the resource range 602 may have an upper resource limit 606 set at eighty percent (80%) CPU utilization so that when the resource pool parameter 608 is represented by a CPU utilization level, a greater than 80% CPU utilization violates the SLA policy. However the lower resource limit 604 may be set at fifty percent (50%) CPU utilization so that when the resource pool parameter 608 is represented by a CPU utilization level, a less than 50% CPU utilization will violate the SLA policy. By making the upper resource 606 limit and the lower resource limit 604 different, the frequency of modifications to the resource pool based on the SLA policy may be reduced. In another embodiment, the resource range 602 may have a lower resource limit 604 set at five (5) resources, so that if the resource pool parameter 608 is represented by the number of resources in the resource pool, a parameter 608 of less than five resources violates the SLA policy. In another embodiment, the resource range 602 may have an upper resource limit 606 set at ten (10) so that if the resource pool parameter 608 has greater than 10 resources then the SLA policy is violated.

If the resource pool parameter 608 is outside the resource range 602, then the resource pool may be modified to bring the resource pool parameter 608 within the resource range 602. The resource pool may be modified in various ways. In an embodiment, to bring the resource pool parameter 608 within the resource range 602, one or more additional resources may be allocated to the resource pool at point 612, where that the resource pool parameter 608 is greater than the upper resource limit 606. One or more resources may be deallocated from the resource pool at point 610 as the resource pool parameter 608 begins to become less than a lower resource limit 604.

Figure 7:
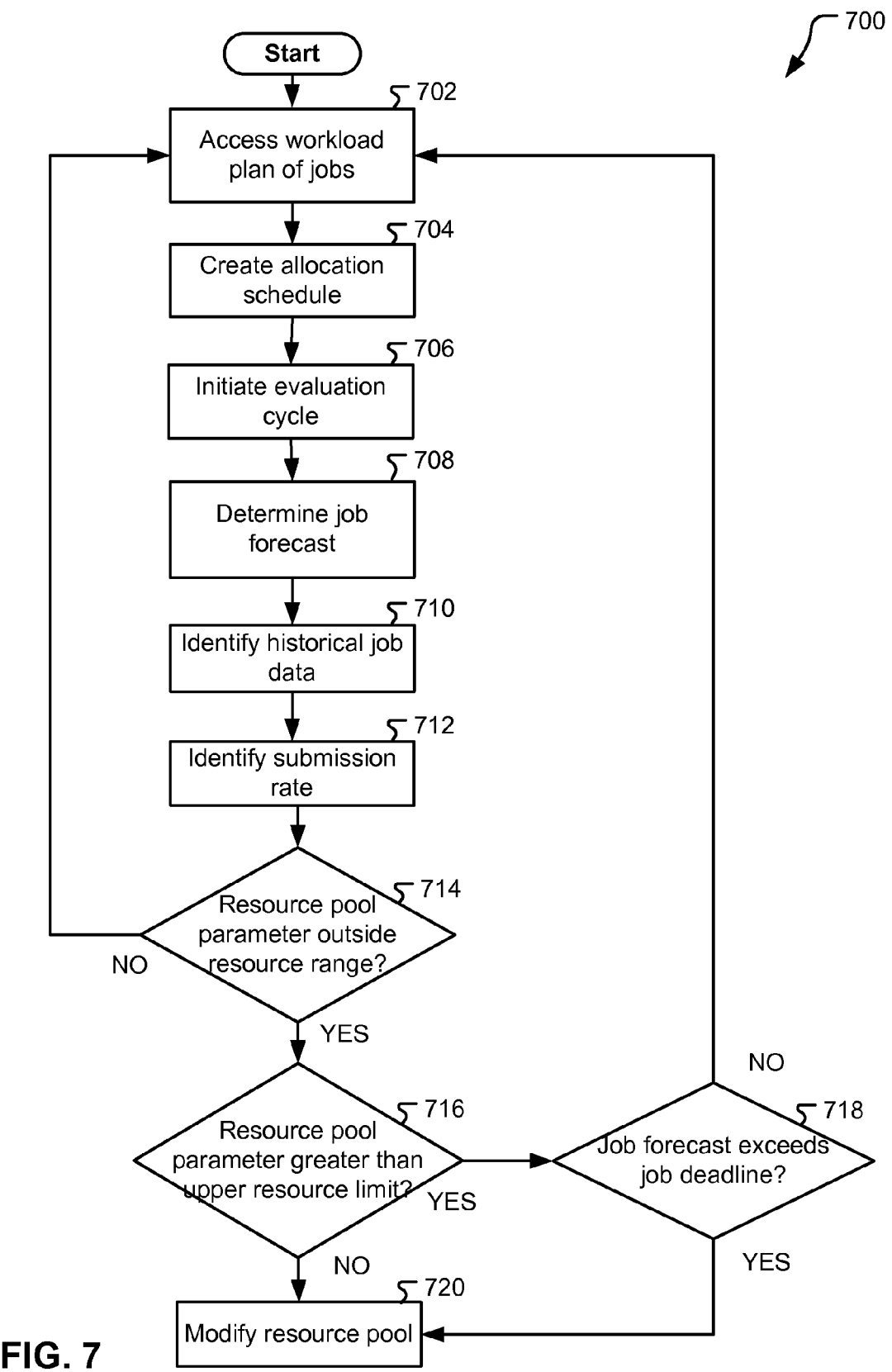
FIG. 7 depicts a flowchart of a method of resource allocation in a job scheduling system according to an embodiment of the present disclosure.

Referring now to FIG. 7, a method 700 of allocating resources in a job scheduling system may be seen according to an embodiment. In operation 702, a workload plan of jobs may be accessed. The workload plan may be the same or substantially similar as the workload plan discussed above. The workload plan may include one or more jobs. Jobs may have priority information. Priority information may be labels which identify critical jobs and non-critical jobs. This may allow the method 700, in an embodiment, to operate when a critical job is identified in an allocation schedule.

In operation 704, an allocation schedule may be created. The allocation schedule may be the same or substantially similar as described above. The allocation schedule may provide a forecast involving incoming jobs and plan one or more resource allocation events. The allocation schedule may have information from a workload plan 403 (FIG. 4) incorporated into the allocation schedule. The allocation schedule may incorporate information including job start dates, job completion dates, job deadlines, job types, priority information, and other job information. The allocation schedule may be a schedule of jobs over time. The allocation schedule may segment the schedule from a workload plan, as described above, into time slots. The time slots may be various sizes and represent portions of the workload plan. In an embodiment, the time slots may equally divide the allocation schedule into time slots of equal size.

In operation 706, a resource allocation evaluation cycle may be initiated. The evaluation cycle may be initiated prior to each time slot of a workload plan, as discussed above. The time slots may be segments of the workload plan broken into segments of time. For each time slot, an iteration of the method 700 may occur.

In operation 708, job forecast may be determined. The job forecast may be a prediction of a job completion date of one or more jobs. The job forecast may also include a resource forecast. The resource forecast may be a prediction of resources needed by the resource pool to perform jobs in the next time slot. The job forecast may be based on job information including historical job data and submission rate of jobs. The job forecast may identify jobs scheduled to start during the next time slot and may access jobs-related historical information (e.g., CPU time, completion time), and information from the resource forecast which may allow computation of an estimation of the job completion date for the one or more jobs in the time slot. For example, in order to determine the job forecast, a list of jobs expected to be running during a particular time slot may be identified. Such analysis, may typically occur in advance of the particular time slot. The jobs scheduled to start in the particular time slot, and jobs which are currently active in the particular time slot may be analyzed in order to determine the job forecast. With the job list obtained, jobs-related historical information (e.g., CPU time, completion time), and the resource forecast, may be identified which may allow computation of an estimation of when the job completion date will occur.

In operation 710, historical job data may be identified. Historical job data may be the same or substantially similar as discussed above. The historical job data may include computing information such as CPU utilization, job completion time, and other historical job information. The historical job data may include predecessors of the jobs expected to run during the next time slot. Historical job data may include information regarding batch jobs. As described above, because batch jobs may be known prior to being scheduled in the workload plan 403, (FIG. 4) and because batch jobs may be scheduled in accord with a periodic pattern (e.g., daily, weekly, etc.), historical job information may be more efficiently used to estimate resource requirements and time requirements of the batch jobs. The historical job data may include computing information such as CPU utilization, job completion time, and other historical job information, to determine a job forecast of the job completion date for the one or more jobs.

In operation 712, submission rate for jobs may be identified. The submission rate for jobs may be the same or substantially similar as discussed above. As transactional jobs may not be known prior to creation of the workload plan, the job forecast of the completion date may be based on a resource forecast which is based on a job submission rate of transactional jobs. For example, the job submission rate may include the average arrival rate observed in one or more previous time slots to the particular time slot. The resource forecast may be based on the arrival rate observed in the previous time slot. However, other methods of determining the resource forecast for transactional jobs may be used including methods utilizing reactive heuristics, proactive heuristics, or other suitable methods.

If a resource pool parameter is outside a resource range then, in decision block 714, the method 700 may progress to operation 716. The resource pool parameter may be a representation of computing resources in the resource pool. For example, the resource pool parameter may include a CPU utilization level, the number of resources in the resource pool, or the ratio the number of jobs in the workload plan to the number of resources in the resource pool. The resource pool parameter may be used to determine whether the resource pool is satisfying the SLA policy, by determining whether the resource pool parameter is within the computing requirements of the SLA policy.

The resource range may be a representation of an SLA policy for a resource pool as discussed above. The resource range may have an upper and lower limit of resources for the resource pool. In an embodiment, the resource range may be based on an average central processing unit utilization parameter of the resource pool. In another embodiment, the resource range may be based on a quantity of resources in the resource pool. In another embodiment, the resource range is based on a ratio of the one or more jobs to the one or more resources in the resource pool. The resource range may employ hysteresis to reduce the frequency of events where the resource pool is modified. In an embodiment the resource range may have an upper resource limit set at eighty percent (80%) CPU utilization so that when the resource pool parameter is represented by a CPU utilization level, a greater than 80% CPU utilization violates the SLA policy. However the lower resource limit may be set at fifty percent (50%) CPU utilization so that when the resource pool parameter is represented by a CPU utilization level, a less than 50% CPU utilization will violate the SLA policy. By making the upper resource limit and the lower resource limit different, the frequency of modifications to the resource pool based on the SLA policy may be reduced. In another embodiment, the resource range may have a lower resource limit set at five (5) resources, so that if the resource pool parameter is represented by the number of resources in the resource pool, a parameter of less than five resources violates the SLA policy. In another embodiment, the resource range may have an upper resource limit set at ten (10) so that if the resource pool parameter has greater than 10 resources then the SLA policy is violated. If the resource pool parameter is within the resource range then, in decision block 716 the method 700 may reset back to operation 702 and the method 700 may begin again.

If the job forecast exceeds a job deadline, in decision block 718, the method 700 may progress to operation 720. The job deadline may be a time limit for one or more jobs to be completed. As described above, the job deadline may be information contained in the workload plan. The deadline may represent a time in the workload plan by which one or more jobs are required to be completed. The job forecast, as described above, may be a representation of one or more job completion dates for the one or more jobs. If the job forecast exceeds the job deadline, then the one or more jobs represented by the job forecast may not be completed before the job deadline. In order to prevent the job forecast from exceeding the job deadline more resources may be allocated to the resource pool. With additional resources the one or more jobs may be completed earlier and may result in a job completion date prior to the job deadline.

In operation 720, a resource pool may be modified. The resource pool may be modified to bring the resource pool parameter within the resource range. The resource pool may be modified in various ways. In an embodiment, to bring the resource pool parameter within the resource range, one or more additional resources may be allocated to the resource pool in response to determining that the resource pool parameter is greater than an upper resource limit. One or more resources may be deallocated from the resource pool in response to determining that the resource pool parameter is less than a lower resource limit. Thus, the resource pool may have resources modified to fall within the resource range.

The present disclosure may be a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method of allocating resources in a job scheduling system, the method comprising:

segmenting a workload plan into one or more time slots, the workload plan having one or more jobs for a resource pool of a resource provider, the one or more jobs scheduled in at least one of the time slots, the resource pool of the resource provider having one or more resources, wherein the workload plan is a schedule for executing jobs using the one or more resources in the resource pool of the resource provider;

determining during each time slot, a respective job forecast for a respective next time slot, each respective job forecast including a respective job completion date for one or more jobs scheduled in the respective next time slot and a prediction of resources needed by the resource pool of the resource provider to perform the one or more scheduled jobs within the respective next time slot, wherein the job completion date is based on historical job data and an arrival rate of transactional jobs observed in one or more previous time slots, wherein the transactional jobs are not scheduled in the workload plan; and for each respective next time slot in which the respective job completion date exceeds a job deadline, modifying the resource pool of the resource provider prior to start of the respective next time slot to bring a resource pool parameter within a resource range in response to determining that the respective job completion date for the one or more jobs scheduled in the respective next time slot exceeds the job deadline;

wherein modifying the resource pool of the resource provider includes allocating additional virtual machines in the resource pool of the resource provider such that the one or more jobs scheduled in the respective next time slot are performed within the respective next time slot.

2. The method of claim 1, wherein modifying the resource pool to bring the resource pool parameter within the resource range in response to determining that the job completion date exceeds the job deadline includes:
   allocating one or more additional resources to the resource pool in response to determining that the resource pool parameter is greater than an upper resource limit.

3. The method of claim 1, wherein modifying the resource pool to bring the resource pool parameter within the resource range in response to determining that the job completion date exceeds the job deadline includes:
   deallocating one or more resources from the resource pool in response to determining that the resource pool parameter is less than a lower resource limit.

4. The method of claim 1, further comprising:
   determining whether the one or more jobs includes a critical job;
   wherein the resource pool is modified to bring the resource pool parameter within a resource range in response to determining that the one or more jobs includes the critical job and determining that the job completion date exceeds the job deadline range.

5. The method of claim 1, wherein the job forecast is based on historical job data and a job submission rate of jobs.

6. The method of claim 1, wherein the one or more resources are accessed by the job scheduling system via a network.

7. The method of claim 1, wherein the one or more resources further include one or more selected from the group consisting of network bandwidth, servers, processing, memory, storage, and applications.

8. The method of claim 1, wherein the resource range is based on an average central processing unit utilization parameter of the resource pool.

9. The method of claim 1, wherein the resource range is based on a quantity of resources in the resource pool.

10. The method of claim 1, wherein the resource range is based on a ratio of the one or more jobs to the one or more resources.

11. A system for allocating resources in a job scheduling system, the system comprising:
   a memory configured to store a workload plan; and
   a processor coupled to the interface and configured to segment the workload plan into one or more equal time slots, the workload plan having one or more jobs for a resource pool of a resource provider, the resource pool of the resource provider having one or more resources, wherein the workload plan is a schedule for executing jobs using the one or more resources in the resource pool of the resource provider;
   wherein the processor is further configured to determine during each time slot, a respective job forecast for a respective next time slot, each respective job forecast including a respective job completion date for one or more jobs scheduled in the respective next time slot and a prediction of resources needed by the resource pool of the resource provider to perform the one or more scheduled jobs within the respective next time slot, wherein the job completion date is based on historical job data and an arrival rate of transactional jobs observed in one or more previous time slots, wherein the transactional jobs are not scheduled in the workload plan; and
   wherein, for each respective next time slot in which the respective job completion date exceeds a job deadline, the processor is further configured to modify the resource pool of the resource provider prior to start of the respective next time slot to bring a resource pool parameter within a resource range in response to determining that the respective job completion date for the one or more jobs scheduled in the respective next time slot exceeds the job deadline
   wherein the processor is configured to modify the resource pool of the resource provider by allocating additional virtual machines in the resource pool of the resource provider such that the one or more jobs scheduled in the respective next time slot are performed within the respective next time slot.

12. The system of claim 11, wherein being configured to modify the resource pool to bring the resource pool parameter within the resource range in response to determining that the job completion date exceeds the job deadline includes being configured to:
   allocate one or more additional resources to the resource pool in response to determining that the resource pool parameter is greater than an upper resource limit.

13. The system of claim 11, wherein being configured to modify the resource pool to bring the resource pool within a resource range in response to determining that the job completion date exceeds the job deadline includes being configured to:
   deallocate one or more resources from the resource pool in response to determining that the resource pool parameter is less than a lower resource limit.

14. The system of claim 11, wherein the processor is further configured to determine whether the one or more jobs includes a critical job and wherein the processor is further configured to modify the resource pool to bring the resource pool parameter within the resource range in response to determining that the one or more jobs includes the critical job and determining that the job completion date exceeds the job deadline.

15. The system of claim 11, wherein the job forecast is based on historical job data and on a job submission rate of transactional jobs.

16. The system of claim 11, wherein the resource range is based on an average central processing unit utilization parameter of the resource pool.

17. The system of claim 11, wherein the resource range is based on a quantity of resources in the resource pool.

18. The system of claim 11, wherein the resource range is based on a ratio of the one or more jobs to the one or more resources.

19. The system of claim 11, wherein the one or more resources further include one or more selected from the group consisting of network bandwidth, servers, processing, memory, storage, and applications.

20. A computer program product comprising a computer readable storage medium having program instructions for allocating resources in a job scheduling system embodied thereon, wherein the program instructions are configured, when executed by at least one programmable processor, to cause the at least one programmable processor to:
   segment a workload plan into one or more time slots, the workload plan having one or more jobs for a resource pool of a resource provider, the one or more jobs scheduled in at least one of the time slots, the resource pool of the resource provider having one or more resources, wherein the workload plan is a schedule for executing jobs using the one or more resources in the resource pool of the resource provider;

determine during each time slot, a respective job forecast for a respective next time slot, each respective job forecast including a respective job completion date for one or more jobs scheduled in the respective next time slot and a prediction of resources needed by the resource pool of the resource provider to perform the one or more scheduled jobs within the respective next time slot, wherein the job completion date is based on historical job data and an arrival rate of transactional jobs observed in one or more previous time slots, wherein the transactional jobs are not scheduled in the workload plan; and for each respective next time slot in which the respective job completion date exceeds a job deadline, modify the resource pool of the resource provider prior to start of the respective next time slot to bring a resource pool parameter within a resource range in response to determining that the respective job completion date for the one or more jobs schedule in the respective next time slot exceeds the job deadline;

wherein to modify the resource pool of the resource provider, the program instructions are configured to cause the at least one programmable processor to allocate additional virtual machines in the resource pool of the resource provider such that the one or more jobs scheduled in the respective next time slot are performed within the respective next time slot.

* * * * *